(No Model.)  L. C. STRONG.  2 Sheets—Sheet 1.
BENCH PLANE.

No. 275,539.  Patented Apr. 10, 1883.

Witnesses:  Inventor:
Edmond Brodhag  pro Levi C. Strong
Howell Bartte  Johnson & Johnson
  Attys

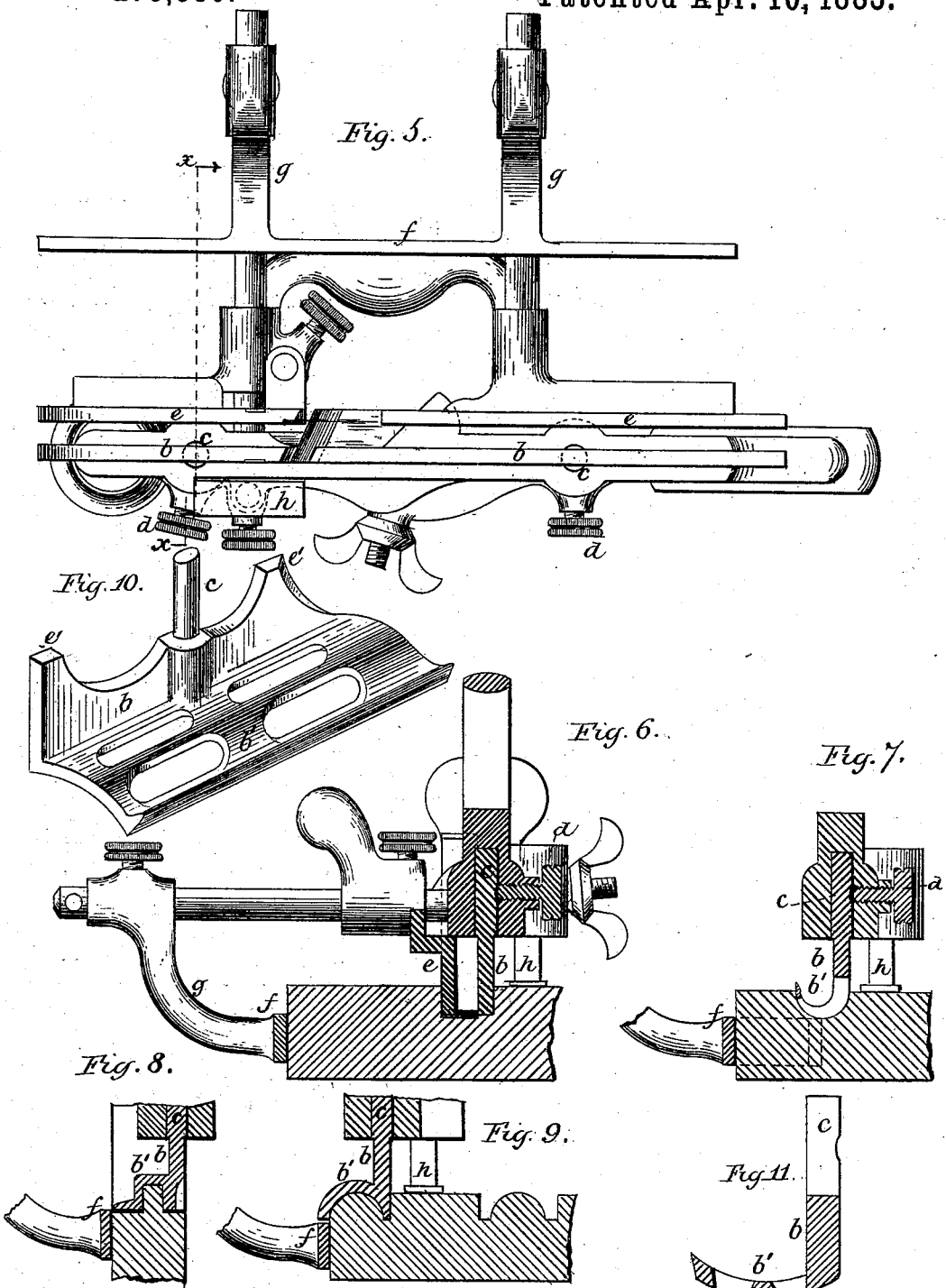

UNITED STATES PATENT OFFICE.

LEVI C. STRONG, OF ALBANY, NEW YORK, ASSIGNOR OF THREE-FOURTHS TO PETER KINNEAR AND CHARLES H. TURNER, BOTH OF SAME PLACE.

BENCH-PLANE.

SPECIFICATION forming part of Letters Patent No. 275,539, dated April 10, 1883.

Application filed July 15, 1882. (No model.)

*To all whom it may concern:*

Be it known that I, LEVI CULVER STRONG, a citizen of the United States, residing at Albany, in the county of Albany and State of New York, have invented new and useful Improvements in Combination Bench-Planes, of which the following is a specification.

I have produced an improved combination-plane for carpenters' use, in which the stock is adapted for attachments for doing a variety of work, such as tonguing and grooving, beading, rabbeting, and various shapes of moldings, which meet all the requirements of the work in being interchangeable with the stock, giving all the conveniences of the separate and expensive styles of planes generally used for different styles of work.

In my improved plane the blade of the stock, which has heretofore been made integral therewith, constitutes the attachable and detachable form or mold corresponding with the form of the cutter used for the desired work, and which have heretofore been used as separate attachments to the stock-blade. A simple and effective fastening is provided for these interchangeable form-blades, whereby they are easily and quickly attached and detached from the stock, and rendered firm in such attachment. Each form-blade has a stem at or near the middle of its length, extending up from its top, and the stock has a socket adapted to receive the stem of each form-blade, and a thumb-screw for binding the stem within said socket, while grooves, recesses, or sockets serve to receive the upper corners of the form-blades to hold and brace them in line with the stock. The stem also serves to brace the form-blades laterally, so that the grooves, recesses, or sockets in the bottom of the stock need only be deep enough to lock the form-blades in line with the stock.

The particular matters which distinguish my plane from others will be made the subject of specific claims, and are illustrated in the accompanying drawings, in which—

Figure 1:
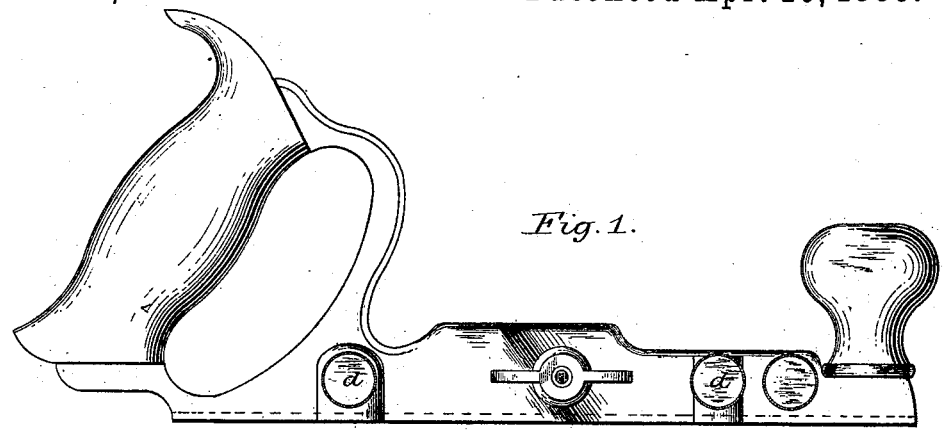
Figure 2:
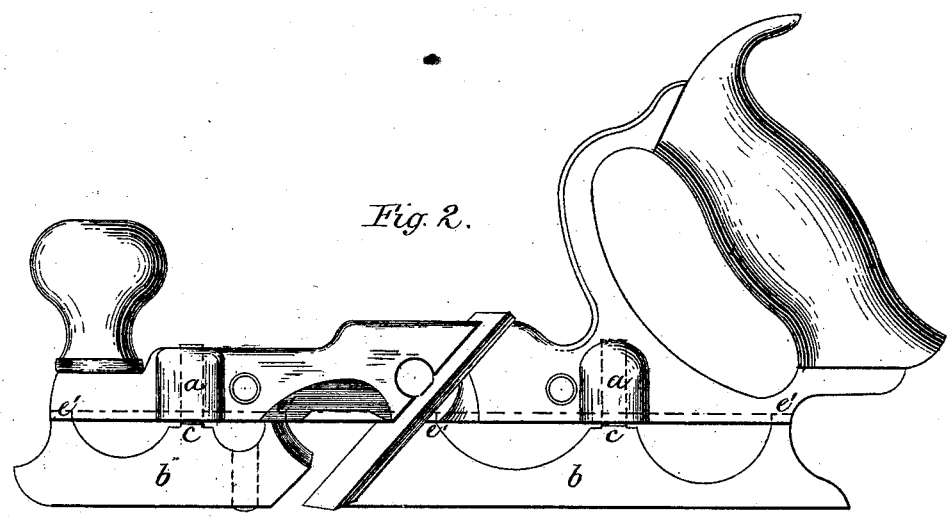
Figure 3:
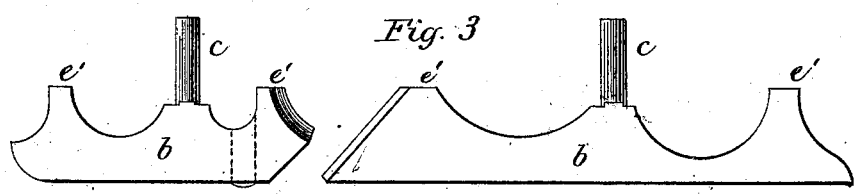
Figure 4:
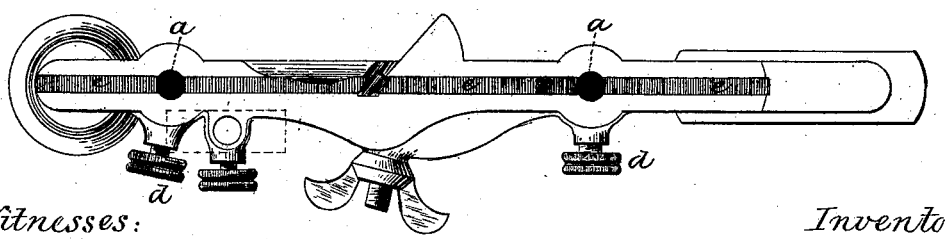

Figure 1 represents a side elevation of the stock of my improved combination-plane, showing the screws for clamping the interchangeable form-blades in the sockets thereof. Fig. 2 represents a similar view, showing the plow-blade clamped to the stock; Fig. 3, the two sections of the plow-blade or runner detached from the stock; Fig. 4, a bottom view of the stock, showing the sockets for the blade-stems; Fig. 5, a bottom view of the plane, with attachments for use as a plow, a dado, and a fillister or rabbet plane; Fig. 6, a cross-section of the same, taken on the line $x\ x$ of Fig. 5; Fig. 7, a similar cross-section, showing the plane with a blade-form adapted for fluting or coving; Fig. 8, a similar section, showing the plane with a blade-form adapted for tonguing and grooving or matching. Fig. 9 shows a section of a blade-form for beading; Fig. 10, a perspective of the skeleton blade-form; and Fig. 11 shows blade-forms for hollows.

The stock is of metal, and has the usual handle, front knob, and middle inclined bearing or back for the bit, upon which it is secured by a bolt having an inclined side or wedge face passing horizontally through the stock, and adapted to clamp the knife-blade upon its inclined seat, in the manner shown and well known in bench-planes.

Hitherto metallic stocks of convertible bench-planes have been provided with attachable and detachable forms or molds of various shapes applied thereto as face-plates or runner-soles, in connection with cutters of corresponding form for performing a variety of work; but by my improvement the forms constitute also the blade of the stock.

The stock is formed with a vertical socket, $a$, about midway between the knife-bearing and each end, and the form and the runner blades $b$ have each a stem, $c$, on their upper edges, at or about the middle of its length, adapted to fit into said socket. The form-blades are of two sections, and the front end of the rear section forms a continuation of the inclined knife-bearing. It is secured to the stock by a clamp-screw, $d$, at its outer side, which is enlarged by boss projections, screw-tapped, to receive the clamping-screws. This gives a secure and convenient fastening for the form-blades, and braces them laterally to the stock. To prevent the blades from turning upon the stem as a pivot, the stock has grooves, recesses, or sockets e in its under side, into which the upper corners, e' e', of the form-blades are inserted, and thereby lock the blades in line with the stock. Both form-blades are fastened in the same manner—one in front, and the other behind the bit—and the stock may have a shallow groove to receive the upper corners; but a continuous groove in the stock is not necessary, as the form-blades may have two or more vertical stems entering corresponding sockets in the stock to keep them in line therewith, as the middle stems and the clamp-screws form the fastening for the interchangeable form-blades. Of whatever form of blade used, it is secured by the same means directly to the stock, and its sole or runner part b' must correspond with the form of the cutter, and projects on the working side of the plane.

For plowing, rabbeting, fillistering, and dadoing, form-blades are not used, but blades as mere runners, as shown in Figs. 2 and 3, fastened, however, in the same manner as the form-blades.

The stock is provided with the usual horizontal detachable arms, screwed into the stock on each side of the bit, for receiving the supplemental stock e and the fence f, which are used according to the character of the work, and made adjustable upon the arms.

The form-blades and the runner-blades extend equal distances from the bottom of the stock, and the fence is constructed so as to be set beneath the form and the runner blades when used without the supplemental stock. For this purpose the fence is carried by curved arms g in such manner that its upper edge will be at a level to allow it to be set so that its guide-face may come in vertical plane of the outer side or face of the blade of the form parts or of the runner, or in any intermediate positions, as shown in Figs. 7, 8, and 9. This gives the advantage of producing fluting or a cove, as in Fig. 7, or an edge or a center bead, as in Fig. 9, by the proper adjustment of the fence and the gage h, which is secured to the stock by a vertical stem and clamp-screw in the usual manner. This adaptation of the fence for adjustment beneath the form-blades and the runner gives a greater variety of work with a less number of attachments, which would otherwise be required with a fence of the usual construction.

The form-blade has an open or skeleton base or running surface, b', and the blade part, b, proper is scalloped between its fastening stem and ends, which is important in reducing their weight to a minimum and lessening the friction.

I claim—

1. The combination of the stock provided with the vertical sockets a a and the bottom groove or recesses, e e, with the form or the runner blade b, having a vertical central stem, c, and end locking bearings, e' e', and the clamping-screws d d, tapped into the side of the stock, substantially as described, for the purpose specified.

2. In a combination bench-plane, the form-blades thereof, having an open or skeleton form surface and a vertical blade-stem, and adapted for attachment to a stock provided with vertical sockets, substantially as described.

3. In a combination bench-plane, the form and runner blades thereof, having each a vertical stem on its upper edge at or near the middle of its length, in combination with a stock having vertical sockets for said stems, and means, substantially as described, for fastening said stems to the stock, substantially as described.

4. The bench-plane herein described, consisting of the metal stock having the vertical sockets a a, the side screw-tapped holes entering said sockets at right angles thereto, and a bottom groove or recess, e, the form or runner blades b b', having each a vertical stem, c, and corners e' e', and the screws d d, all constructed for use substantially as herein set forth.

In testimony whereof I have hereunto set my hand in the presence of two subscribing witnesses.

LEVI CULVER STRONG.

Witnesses:
A. E. H. JOHNSON,
J. W. HAMILTON JOHNSON.